(12) United States Patent
Conrad

(10) Patent No.: US 10,185,974 B1
(45) Date of Patent: Jan. 22, 2019

(54) USER-LEVEL BID REQUEST PREFERENCES

(71) Applicant: AudienceScience Inc., Bellevue, WA (US)

(72) Inventor: Frank Conrad, Bellevue, WA (US)

(73) Assignee: AudienceScience Inc., Bellevue, WA (US)

( * ) Notice: Subject to any disclaimer, the term of this patent is extended or adjusted under 35 U.S.C. 154(b) by 483 days.

(21) Appl. No.: 15/059,161

(22) Filed: Mar. 2, 2016

Related U.S. Application Data

(60) Provisional application No. 62/268,405, filed on Dec. 16, 2015.

(51) Int. Cl.
*G06Q 30/02* (2012.01)

(52) U.S. Cl.
CPC ..... *G06Q 30/0255* (2013.01); *G06Q 30/0257* (2013.01); *G06Q 30/0275* (2013.01); *G06Q 30/0277* (2013.01)

(58) Field of Classification Search
CPC .................................................. G06Q 30/02
See application file for complete search history.

(56) References Cited

U.S. PATENT DOCUMENTS

| | | | | |
|---|---|---|---|---|
| 2005/0171897 A1* | 8/2005 | Forsythe | ............. | G06Q 20/102 705/37 |
| 2006/0036490 A1* | 2/2006 | Sagalyn | ................. | G06Q 30/02 705/14.5 |
| 2009/0150224 A1* | 6/2009 | Lu | ........................ | G06O 30/02 705/7.29 |
| 2010/0217525 A1* | 8/2010 | King | ...................... | G06Q 30/02 701/300 |
| 2011/0258056 A1* | 10/2011 | Ioffe | ...................... | G06Q 30/02 705/14.73 |
| 2012/0023522 A1* | 1/2012 | Anderson | .............. | G06Q 30/02 725/35 |

* cited by examiner

*Primary Examiner* — Vincent M Cao
(74) *Attorney, Agent, or Firm* — Perkins Coie LLP

(57) ABSTRACT

A facility for a real-time bidding ("RTB") bidder service to cause an RTB auction service to manage bid requests relating to a specified user is described. The facility receives a bid request from an auction service seeking a bid for presenting an advertisement to a user, including user data identifying the user; evaluates the user data; and based on the evaluating, transmits to the auction service an embargo request specifying a period of time for the auction service to prevent bid requests seeking bids for presenting advertising messages to the user from being sent from the auction service to the bidder service.

30 Claims, 6 Drawing Sheets

US 10,185,974 B1

USER-LEVEL BID REQUEST PREFERENCES

CROSS-REFERENCE TO RELATED APPLICATION(S)

This application claims the benefit of U.S. Provisional Patent Application No. 62/268,405, entitled "USER-LEVEL BID REQUEST PREFERENCES," filed Dec. 16, 2015, which is hereby incorporated by reference in its entirety.

BACKGROUND

Real-time bidding ("RTB") is a way of selling online advertising inventory. RTB allows an individual ad impression to be put up for bid in real time. This is done through a programmatic on-the-spot auction, which is similar to how certain financial markets operate.

For example, an OpenRTB API Specification, available from the Interactive Advertising Bureau at www.iab.net/guidelines/rtbproject, specifies contents of a bid request message sent by an auction service such as ad exchange (representing a publisher) to several bidder services each representing one or more advertisers, inviting the bidder services to bid on the opportunity to present an ad in an available placement on a web page that a particular user has requested from the publisher. The bid request includes information about the publisher and the placement, and any information the auction service has about the identity of the user and the user's device. Any of the bidder services interested in buying the impression can reply with a bid response containing a bid amount; the highest-bidding bidder service has the opportunity to present an advertising message in the placement, and is charged for this opportunity.

DETAILED DESCRIPTION

Overview

Figure 1:
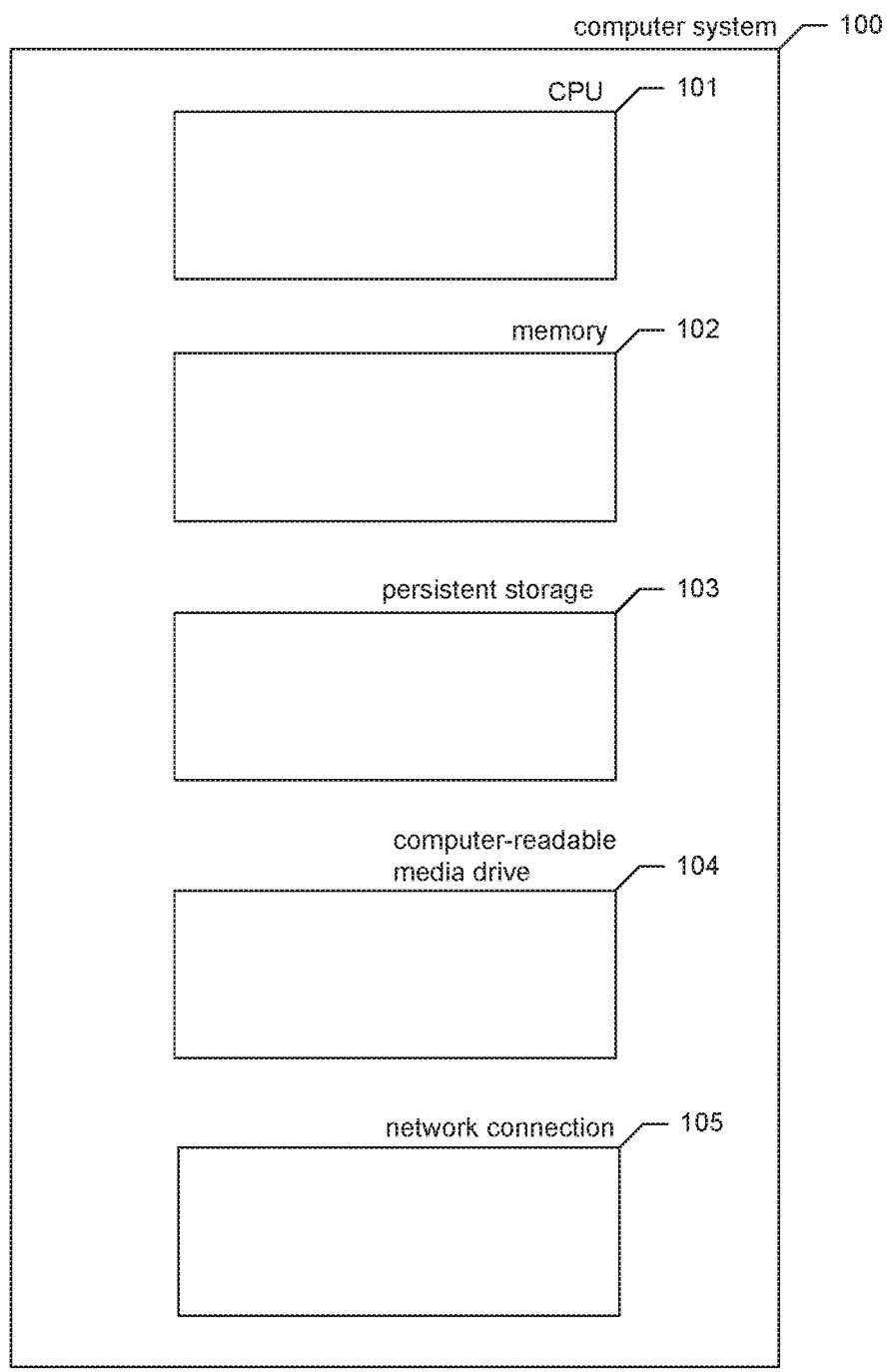
FIG. 1 is a block diagram showing some of the components typically incorporated in at least some of the computer systems and other devices on which the facility executes.

The inventors have recognized that conventional RTB processes incur a considerable amount of computation and communication to fill each advertising opportunity on each page loaded by each user as the pages load. For a bidder service, processing RTB bid requests—in some cases billions of requests per day—can require significant levels of low-latency computing resources, at substantial cost. Bidder services generally process all the opportunities they receive, bidding on a small fraction of those opportunities, and winning even fewer.

Auction services can send bid requests for a given placement to any number of bidder services. In some cases, to avoid overloading the hardware infrastructure supporting a bidder service, an auction service permits bidder services to designate the rate at which bid requests should be sent to each bidder service, such as 1 billion bid requests per day. It is common for an auction service to select the bid requests sent to each bidder service randomly within the bounds of any per-bidder volume constraints. The inventors have noted, however, that such approaches can be inefficient, because while the bidder services receive a lower total number of bid requests that require a lower level of computing and communication resources to process, they may also miss out on bid requests on which they would otherwise bid.

To address these disadvantages of conventional RTB processes, the inventors have conceived and reduced to practice a software and/or hardware facility that enables a bidder service to exert control over which RTB bid requests it receives ("the facility"). In general, the facility increases the likelihood that a bidder will bid on each bid request it receives, and the total number of bid requests it will bid on. Also, in some cases, the facility allows a bidder service to employ a reduced-capacity hardware infrastructure, because the reduced infrastructure is adequate to service all of the bid requests selected for the bidder service that are needed for the bidder service to purchase an adequate supply of placements for a given set of advertising campaigns specifying a certain total volume.

In various embodiments, the facility allows a bidder to specify, e.g., in a bid response responsive to a bid request for a particular user, a condition that should be satisfied before the auction service will send certain additional bid requests, such as additional bid requests for the same user. For example, when a bidder receives a bid request for a particular user, the bidder can respond by specifying that no additional bid requests for the same user be sent for seven days. In some embodiments, the response can include a time value ranging from seconds (or an even shorter period) to days (or an even longer period). In some cases, a bidder can specify that no additional bid request ever be sent for the user that is the subject of the bid request and bid response. The bidder can make similar specifications for a publisher and/or a publisher website.

In some embodiments, the bidder can send subsequent communications adjusting previously specified bid request conditions. For example, where a bidder on Monday specifies that additional bid requests for a particular user not be sent for seven days, and the bidder on Wednesday identifies an advertising campaign for which the user is suited, the bidder can send a subsequent communication indicating that additional bid requests for that user can be sent immediately.

The inventors have determined that RTB bidder services can obtain more relevant opportunities with less overhead by directing auction services to filter bid requests. Conventional RTB approaches that do not allow bidder services to tailor the bid requests they receive are less efficient and less effective. By instructing an auction service to remove unwanted opportunities, e.g., on the basis of user information, a bidder service can avoid receiving and processing bid requests that the bidder service is unlikely to bid on. Therefore, the bidder service can use the same amount of computing hardware and networking bandwidth to receive and process only bid requests that the bidder service is more likely to bid on. Similarly, an auction service can use its networking bandwidth to transmit fewer bid requests that are unlikely to generate bid responses, leaving more bandwidth to send more bid requests for more potentially valuable opportunities to more interested bidders, resulting in more bidding, producing more advertising revenue.

By operating in some or all of the ways described above, the facility improves the targeting accuracy of bid requests, increasing the average value of received bid requests and the likelihood of being able to fulfill a certain set of campaigns with respect to qualifying users, reducing the cost of finding relevant bid requests, and facilitating online advertising market transactions.

DESCRIPTION OF FIGURES

FIG. 1 is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data—including data structures, database tables, other data tables, etc.—while they are being used; a persistent storage device 103, such as a hard drive, for persistently storing programs and data; a computer-readable media drive 104, such as a USB flash drive, for reading programs and data stored on a computer-readable medium; and a network connection 105 for connecting the computer system to other computer systems to exchange programs and/or data—including data structures—such as via the Internet or another network and its networking hardware, such as switches, routers, repeaters, electrical cables and optical fibers, light emitters and receivers, radio transmitters and receivers, and the like. The terms "memory" and "computer-readable storage medium" include any combination of temporary and/or permanent storage, e.g., read-only memory (ROM) and writable memory (e.g., random access memory or RAM), writable non-volatile memory such as flash memory, hard drives, removable media, magnetically or optically readable discs, nanotechnology memory, synthetic biological memory, and so forth, but do not include a transitory propagating signal per se. In various embodiments, the facility can be accessed by any suitable user interface including Web services calls to suitable APIs. While computer systems configured as described above are typically used to support the operation of the facility, one of ordinary skill in the art will appreciate that the facility may be implemented using devices of various types and configurations, and having various components.

Figure 2:
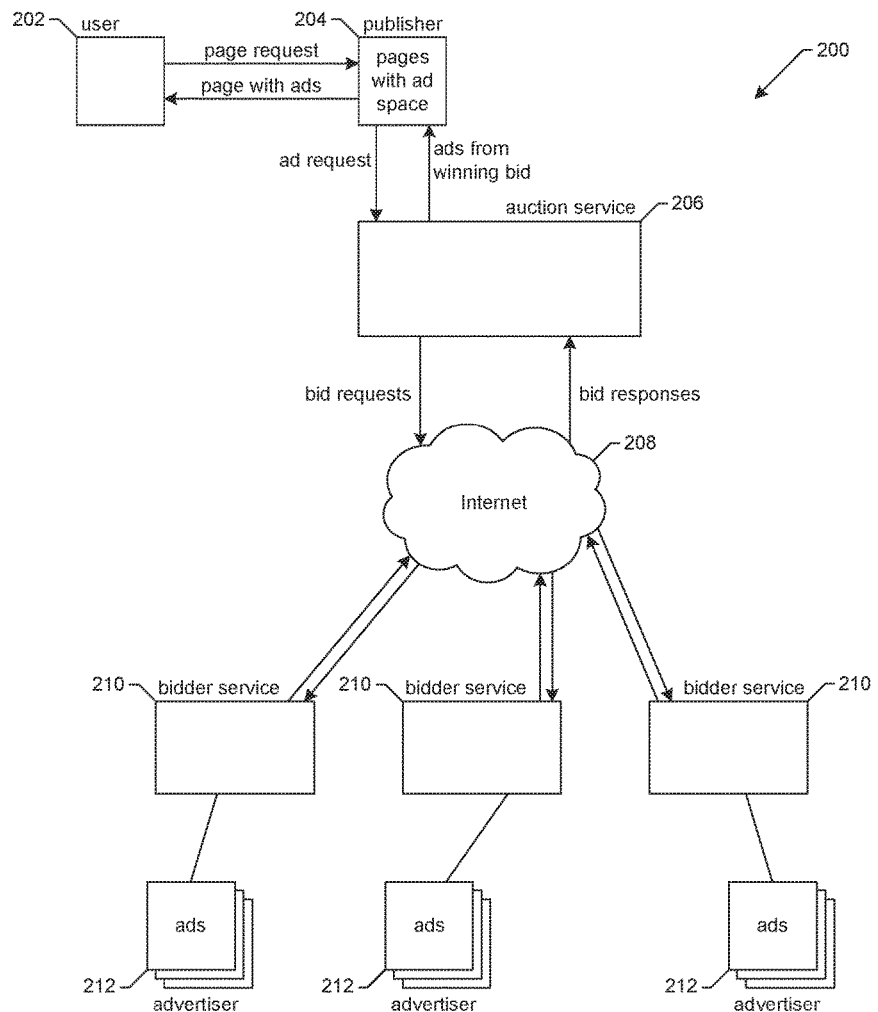
FIG. 2 is a high-level schematic diagram illustrating logical relationships among RTB auction service and bidder service systems in some arrangements within which the facility can operate.

FIG. 2 is a high-level schematic diagram 200 illustrating logical relationships among RTB auction service and bidder service systems in some arrangements within which the facility can operate. A computing system of a user 202 requests a page from a computing system of a publisher 204, such as by the user 202 navigating the user's Web browser to the publisher's site. In response to the request, the publisher 204 sends data to the user 202 for rendering the requested page. The page includes advertising space for one or more advertisers 212 to advertise to the user 202. Just before or while the requested page is transmitted and rendered for the user 202, the publisher 204 computing system sends information about the available ad placements or impressions on the page to an auction service 206 computing system. The auction service 206 sells the advertising placements in the requested page on behalf of the publisher 204 via an RTB auction. The auction service 206 computing system transmits bid requests to a number of bidder service 210 computing systems via a network such as the Internet 208, inviting each bidder service 210 to bid on behalf of an advertiser 212 to place one or more advertisements on the page to be displayed to the user 202. The bidder service 210 computing systems typically evaluate the parameters of the bid request, such as by comparing information about the page and the user against advertising campaign requests or requirements from one or more advertisers 212 to determine whether to submit a bid response and how much to bid on behalf of an advertiser 212 to place an ad in the page provided by the publisher 204 to the user 202.

While various embodiments are described in terms of the environment described above, those skilled in the art will appreciate that the facility may be implemented in a variety of environments including a single, monolithic computer system, as well as various other combinations of computer systems or similar devices connected in various ways including cloud computing resources. Within and between auction service and bidder service computing systems, bid requests and responses may be routed, for example, to a single server computer system, or may be load-balanced among a number of server computer systems. Server computer systems that transmit and receive messages may include computing nodes used to determine whether to transmit a bid request or response, or such computing nodes may be remote from the server computing systems.

Figure 3:
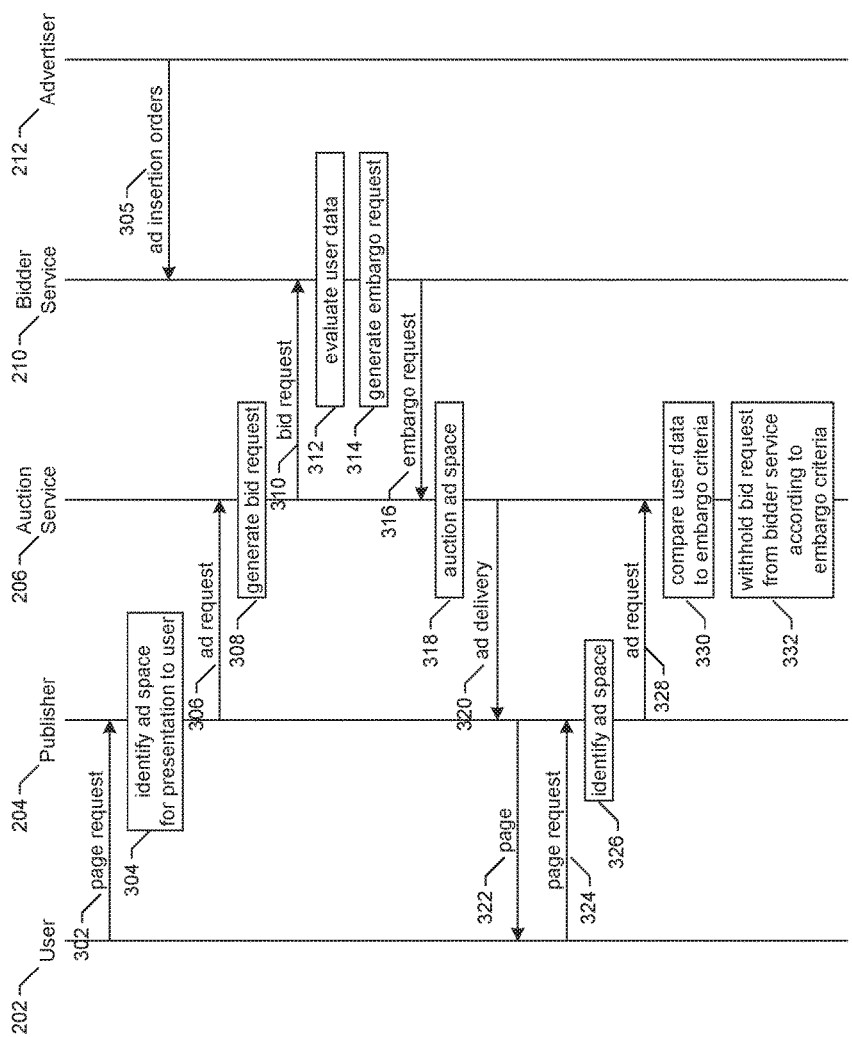
FIG. 3 is a sequence diagram illustrating RTB auction service and bidder service system interactions in accordance with some embodiments of the facility.

FIG. 3 is a sequence diagram illustrating RTB auction service and bidder service system interactions in accordance with some embodiments of the facility. In the illustrated example, an auction service 206 obtains advertising opportunity information regarding an online publisher 204 page to be presented to a user 202, solicits a bidder service 210 for a bid for an advertiser 212 to place an advertisement, and receives an embargo request from the bidder service 210 regarding the user 202, so that when the auction service 206 obtains another advertising opportunity to present an ad to the same user 202, the auction service 206 refrains from soliciting the bidder service 210 for a bid to present an ad to that user 202.

In message 302, the user 202 computing device or system sends a page request to the online publisher 204. For example, the user 202 can request an XML page from the publisher 204 (e.g., via a content delivery network). In block 304, the publisher 204 identifies an ad space (aka an impression, an ad placement, or a placement opportunity) associated with the page to be provided to the user 202. Such ad spaces can take various forms such as banner ads, native ads, rich media (e.g., videos, interactive media, site skins), etc. In message 306, the publisher 204 transmits an ad request to the auction service 206. For example, the ad request 306 can contain information about the page on which the ad will be presented (e.g., the title and/or keywords for the content of the page, the size of the ad space, whether it is "above the fold" so that it is presented immediately to the user 202, etc.) and about the user to whom it will be presented (e.g., a user identifier, user device type, IP address, geo-location associated with a computing device of the user 202, demographic information, etc.).

Separately, in message 305, the advertiser 212 transmits one or more ad insertion orders to the bidder service 210. For example, the advertiser 212 may specify target audiences, rates the advertiser is willing to pay, frequency caps for presenting advertisements to a user, how long the campaign should run, and so on for various ad campaigns.

In block 308, the auction service 206 generates a bid request seeking a bid for presenting an advertisement to the user 202 in connection with the publisher 204 page. In message 310, the auction service 206 sends the bid request to the bidder service 210. In block 312, the bidder service 210 evaluates the user data included in the message 310 bid request. For example, in various embodiments of the facility, a computing system of the bidder service 210 determines suitability of the user 202 for one or more advertising campaigns of the advertiser 212, such as by comparing the user data included in the message 310 bid request and the criteria of the message 305 ad insertion orders. For example, the bidder service 210 may determine that the user 202 is a recognized customer (e.g., a previous purchaser) of the advertiser 212, so that the advertiser 212 is willing to pay more to present an ad to the user 202. As another example, the bidder service 210 may determine that the bidder service 210 presented at least a threshold number of advertisements from the advertiser 212 to the user 202 within a threshold period of recency, so that the bidder service 210 will not bid to present additional ads to the user 202 for a period of time.

In block 314, the bidder service 210 generates an embargo request. For example, in various embodiments of the facility, the embargo request specifies a period of time for the auction service 206 to prevent bid requests seeking bids for presenting advertising messages to the user 202 from being sent from the auction service 206 to the bidder service 210. In message 316, the bidder service 210 transmits the embargo request to the auction service 206. In some embodiments, the bidder service 210 transmits the embargo request 316 to the auction service 206 together with a bid response replying to the bid request 310, or as part of such a bid response. In some embodiments, the bidder service 210 transmits the embargo request 316 to the auction service 206 instead of a bid response, or after the time for a bidder service 210 to bid for an ad space has concluded.

In block 318, the auction service 206 auctions the ad space to determine a winning bidder based on bid responses received by the auction service 206 in response to the bid request 310. For example, the auction service 206 can sell the ad space to the advertiser willing to pay the highest price for it, or sell the ad space to an advertiser willing to pay for all ad spaces on the page. In message 320, the auction service 206 delivers one or more ads to the publisher 204 for the publisher 204 to include in the page to be presented to the user 202. In message 322, the page, including ads of the winning bidder, is delivered to the user 322.

In message 324, the same user 202 makes a second page request to the publisher 204, e.g., at a later time and/or for a different page. In block 326, similarly to block 304 described above, the publisher 204 identifies an ad space associated with the page to be provided to the user 202; and in message 328, as in message 306 described above, the publisher 204 transmits an ad request to the auction service 206.

In block 330, the auction service 206 compares the user data contained in the ad request 328 (describing the user 202) to the criteria from the bidder service 210 received in the embargo request 316. For example, the auction service 206 may determine that the user 202 who requested the page is the same user that the embargo request 316 specifies. In block 322, if the auction service 206 determines that the user is the same and that any other criteria are satisfied (e.g., verifying that the embargo against sending the bidder service 210 any bid requests relating to the specified user is still in effect or has not expired), then the auction service 206 refrains from sending a bid request to the bidder service 210.

Figure 4:
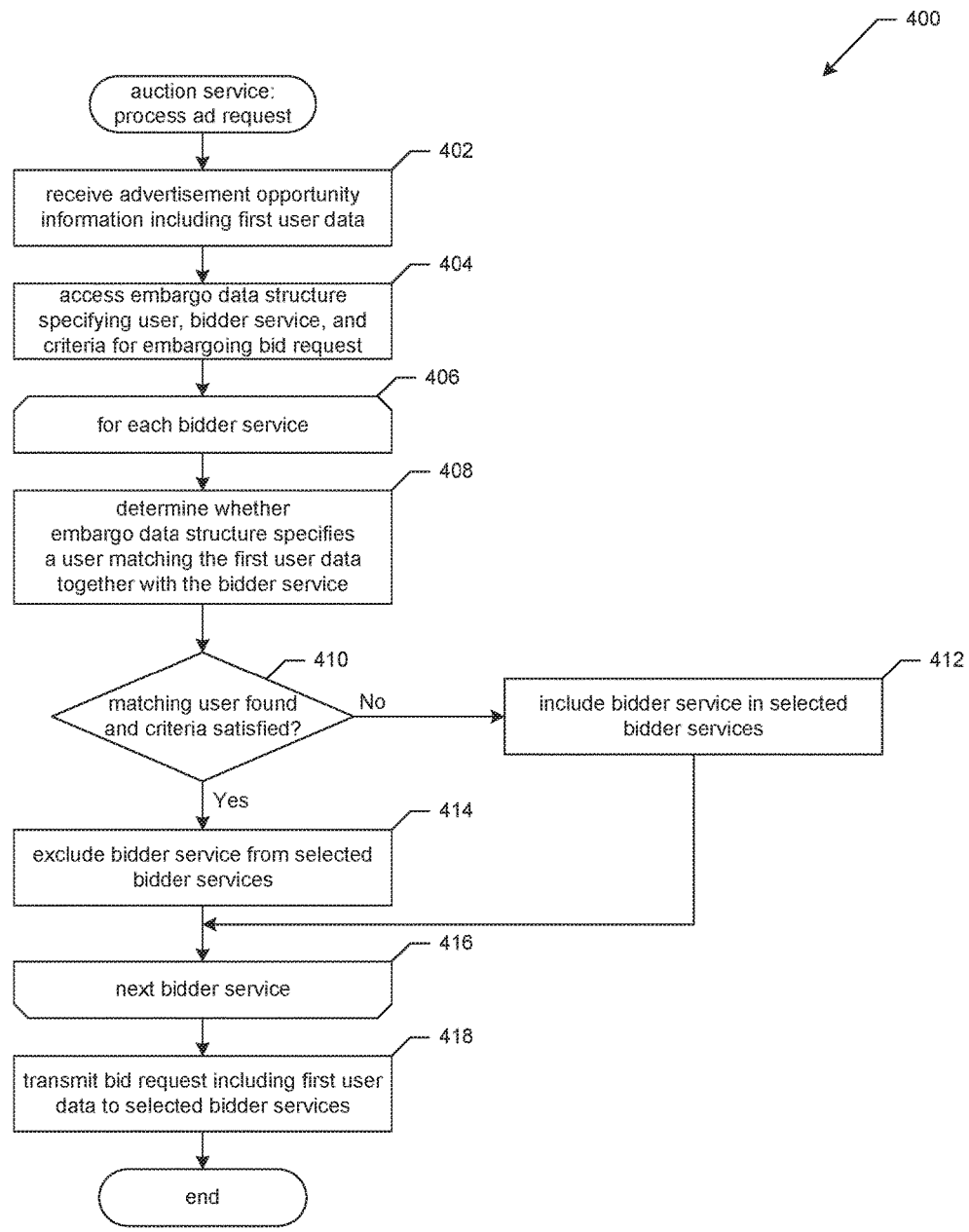
FIG. 4 is a flow diagram showing steps typically performed by the facility in some embodiments for an RTB auction service to process a publisher's ad request.

FIG. 4 is a flow diagram showing steps typically performed by the facility in some embodiments for an RTB auction service 206 computing system to process a publisher's ad request. In various embodiments, the auction service 206 can determine, using the steps illustrated in FIG. 4, whether to transmit a bid request to a particular bidder service based on the identity of the user 202 for whom the publisher 204 has requested an ad. In step 402, the auction service 206 receives information from a publisher 204 about a particular advertisement placement opportunity, including user data identifying a first user 202 to whom an ad may be presented. For example, the user data can include one or more user identifier strings, information about the user's device (e.g., one or more device identifier strings, a hashed value representing a hardware identifier, a user agent string, etc.), the user's interests, age, sex, location, browser cookie information, etc. In step 404, the auction service 206 accesses an embargo data structure containing records that specify combinations of users, bidder services, and criteria for whether to transmit a bid request regarding a specified user 202 to a particular bidder service 210. In various embodiments, such a record specifies a bidder service 210 to which a bid request regarding the specified user 202 should not be sent.

The facility carries out steps 406-416 for each bidder service 210 of any number of bidder services from which the auction service 206 may solicit bids to present an advertisement to the user 202. In some embodiments, the auction service 206 has information that one or more bidder services are included (e.g., associated with one or more records) in the embargo data structure, and the facility carries out steps 406-416 for each such bidder service 210. In some embodiments, the facility maintains separate embargo data structures for each bidder service 210. In step 408, the facility determines whether the embargo data structure specifies, together with the bidder service 210, a user matching the first user data, e.g., a record specifying that advertising opportunities regarding the user 202 should not be sent to the bidder service 210. In some embodiments, the auction service 206 compares user data identifying the first user 202 to corresponding identifying data for each user specified in the embargo data structure. In some embodiments, the facility uses one or more indexes to determine whether the embargo data structure specifies a combination of the user 202 and the bidder service 210 more efficiently than a linear search of each record in the embargo data structure.

In some embodiments, the embargo data structure records include criteria for transmitting a bid request regarding the specified user 202, such as a period of time (e.g., an expiration or duration) for the embargo. The facility may utilize criteria of various types to control whether and/or when the auction service 206 may transmit bid requests regarding the specified user 202 to the specified bidder service 210; for example, time of day, publisher domain, site language, etc. If the embargo data structure record includes such criteria, then in block 408, when a matching user and bidder service are found, the auction service 206 further determines whether the criteria for excluding the bidder service 210 from a bid request are satisfied.

In decision block 410, if the user data identifying the first user 202 does not match a user specified in the embargo data structure in combination with the bidder service, or if the user data matches a record specifying the user 202 and bidder service 210 but any associated embargoing criteria are not satisfied, e.g., if an embargo time period has expired, then in step 412, the auction service 206 may include the specified bidder service 210 in a set of selected bidder services from which the auction service 206 will request a bid to advertise to the first user 202. On the other hand, if the user data identifying the first user 202 matches a user specified in the embargo data structure in combination with the bidder service 210, and if any criteria are satisfied, e.g., an embargo time period is still in effect, then in step 414, the auction service 206 excludes the specified bidder service 210 from the set of selected bidder services from which the auction service 206 will request a bid. In step 416, the auction service 206 proceeds to the next bidder service. In step 418, the auction service 206 transmits a bid request including data about the user 202 to the set of selected bidder services 210.

Those skilled in the art will appreciate that the steps 400 shown in FIG. 4 and in each of the flow diagrams discussed below may be altered in a variety of ways. For example, the order of the steps may be rearranged; some steps may be performed in parallel; shown steps may be omitted, or other steps may be included; etc.

Figure 5:
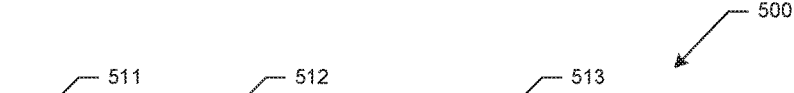
FIG. 5 is a table diagram showing sample contents of a user embargo table containing a mapping between combinations of user identifiers and RTB bidder service identifiers to embargo expiration times.

FIG. 5 is a table diagram showing sample contents of a user embargo table 500 containing a mapping between combinations of user identifiers and RTB bidder service identifiers to embargo expiration times.

The user embargo table 500 is made up of rows 501-503, each representing the combination of a user and a bidder service that should not be sent bid requests regarding opportunities to advertise to the specified user while the embargo is in effect. Each row is divided into the following columns: a User ID column 511 containing an identifier for the user 202; an RTB Bidder Service column 512 containing an identifier for the bidder service 210; and an Embargo Expiration Time column 513 containing an indication of when the embargo should end. For example, row 501 indicates that the user associated with ID number 10000001 has been specified by RTB bidder service AudienceScience, Inc. as someone who AudienceScience is not interested in advertising to until Oct. 10, 2015. In some embodiments, the user embargo table 500 is indexed on the User ID column 511, such that this index plus the user embargo table 500 can be used to look up the bidder service 210 that has requested an embargo for a specified user 202. In some embodiments, the user embargo table 500 is indexed on the RTB Bidder Service column 512, such that this index plus the user embargo table 500 can be used to look up what users 202 have been embargoed by a particular RTB bidder service 210. In some embodiments, the user embargo table 500 is indexed on the Embargo Expiration Time column 513, such that this index plus the user embargo table 500 can be used to determine when to update embargo information or modify the user embargo table 500.

Though the contents of the user embargo table 500 are included to present a comprehensible example, those skilled in the art will appreciate that the facility can use a user embargo table 500 having columns corresponding to different and/or a larger number of attributes, as well as a larger number of rows. The table may include, for example, additional or different identifiers, and/or other types of user data. Though FIG. 5 shows a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be indexed in ways not shown; may be compressed and/or encrypted; etc.

Figure 6:
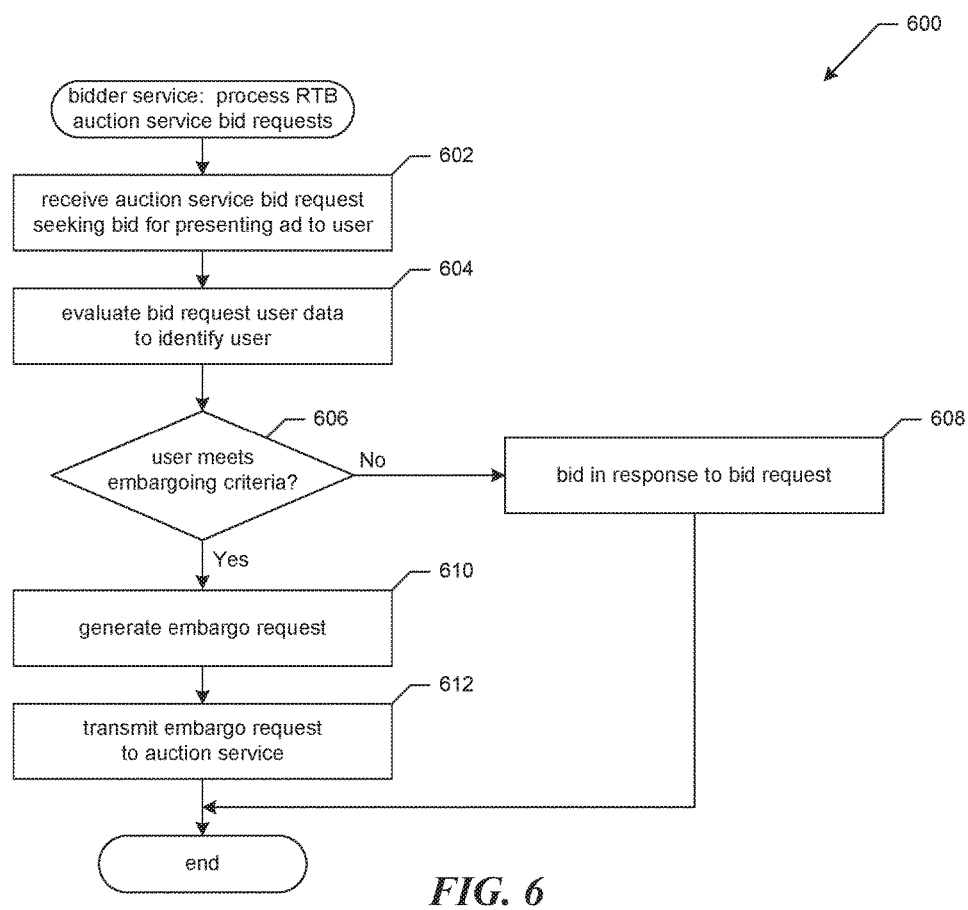
FIG. 6 is a flow diagram showing steps typically performed by the facility in some embodiments for an RTB bidder service to cause an RTB auction service to embargo bid requests relating to a user.

FIG. 6 is a flow diagram showing steps typically performed by the facility in some embodiments for an RTB bidder service 210 to cause an RTB auction service 206 to embargo bid requests relating to a user 202. In step 602, the bidder service 210 receives, from the auction service 206, a bid request seeking a bid from the bidder service 210 for presenting an advertisement to the user 202. In step 604, the bidder service 210 evaluates user data included in the bid request describing and/or identifying the user 202. For example, the bid request may include a data structure containing fields with information about the user and/or the user's device, sufficient to categorize and/or uniquely identify the user 202. In some embodiments, evaluating the bid request user data to identify the user 202 can include identifying the user's web browser or computing system environment, and/or comparing identifiers of the user 202 to information about individuals known to advertisers 212 and/or the bidder service 210. For example, the bidder service 210 may compare a user identifier or device identifier (e.g., a cryptographic hash of an identifier number) to a database containing records of users to whom the bidder service 210 has presented advertisements on behalf of one or more advertisers 212.

In decision block 606, the bidder service 210 determines whether the user 202 meets embargoing criteria. For example, the bidder service 210 may determine that the bidder service previously (e.g., sufficiently recently) presented at least a threshold number of advertisements (e.g., ads associated with a particular advertising campaign) to the identified user 202, and may determine that after presenting that number of ads to a user, the bidder service 210 does not wish to pay to present additional ads to that user until a certain period of time has elapsed. For example, after presenting an advertiser's banner ads to a user 202 multiple times, the bidder service 210 may not want to present the user another ad from that advertiser until the following day.

If the bidder service 210 determines that the user 202 does not meet its embargoing criteria, then in step 608 the bidder service 210 bids (or declines to bid) to present an ad to the user 202 in response to the bid request. If, on the other hand, the bidder service 210 determines that the user meets its embargoing criteria, then in step 610, the bidder service 210 generates an embargo request identifying the user 202 and requesting that the auction service 206 not send the bidder service 210 bid requests relating to the user 202. For example, the embargo request can specify a period of time for the auction service 206 to prevent bid requests seeking bids for presenting advertising messages to the user 202 from being sent from the auction service 206 to the bidder service 210. In some embodiments, the bidder service 210 generates the embargo request as a response to the auction service's bid request (e.g., including a code referencing the bid request) for consistent identification of the user 202 between the bidder service 210 and the auction service 206. In step 612, the bidder service 210 transmits the embargo request to the auction service 206.

Figure 7:
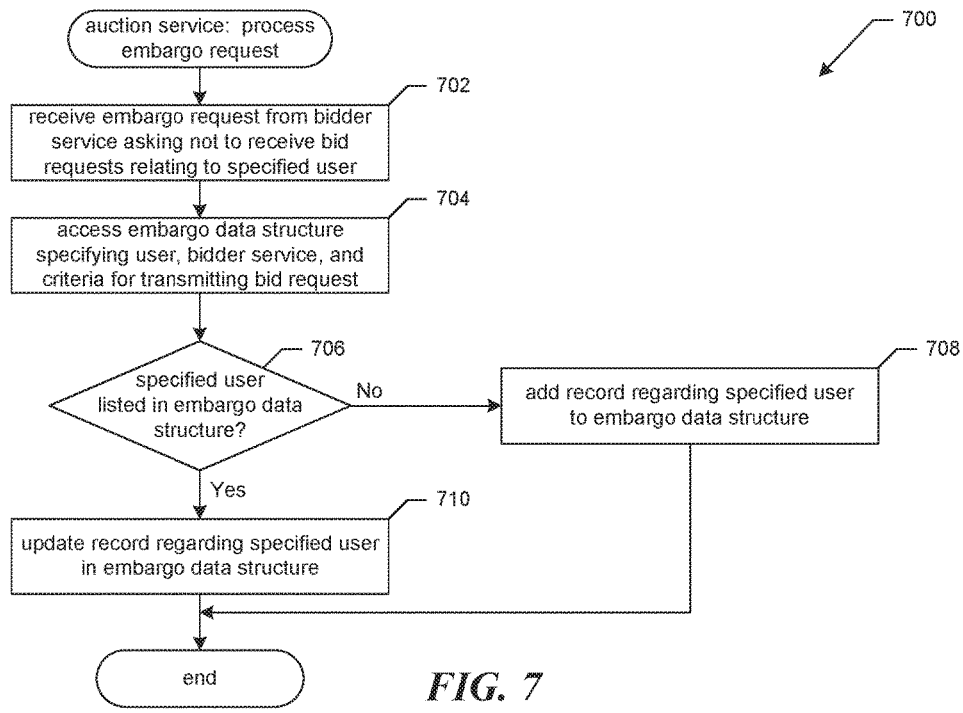
FIG. 7 is a flow diagram showing steps typically performed by the facility in some embodiments for an RTB auction service to process an embargo request.

FIG. 7 is a flow diagram showing steps typically performed by the facility in some embodiments for an RTB auction service 206 to process an embargo request. In step 702, the auction service 206 receives an embargo request from a bidder service 210, indicating that the bidder service 210 does not wish to receive bid requests for opportunities to advertise to a specified user 202. In step 704, the auction service 206 accesses an embargo data structure containing records that specify combinations of users, bidder services, and criteria for whether to transmit a bid request regarding an opportunity for a particular bidder service 210 to advertise to a specified user 202.

In decision block 706, the auction service 206 determines whether the embargo data structure contains a record corresponding to the user 202 specified in the embargo request and the bidder service 210. If no such record exists in the embargo data structure, then in step 708, the auction service 206 adds a record regarding the specified user 202 to the embargo data structure. For example, as illustrated above with reference to table 500 in FIG. 5, such a record can specify the user 202, the bidder service 210, and any criteria such as an embargo period for the auction service 206 to withhold from the bidder service 210 any bid requests relating to the user 202. On the other hand, if the auction service 206 determines that the embargo data structure does already contain a record corresponding to the user 202 specified in the embargo request and the bidder service 210, then in step 710, the auction service 206 updates that record to reflect any new information in the embargo request. For example, if the embargo request contains a change in the duration or expiration of the embargo, the auction service 206 updates the record in the embargo data structure to reflect that change.

Figure 8:
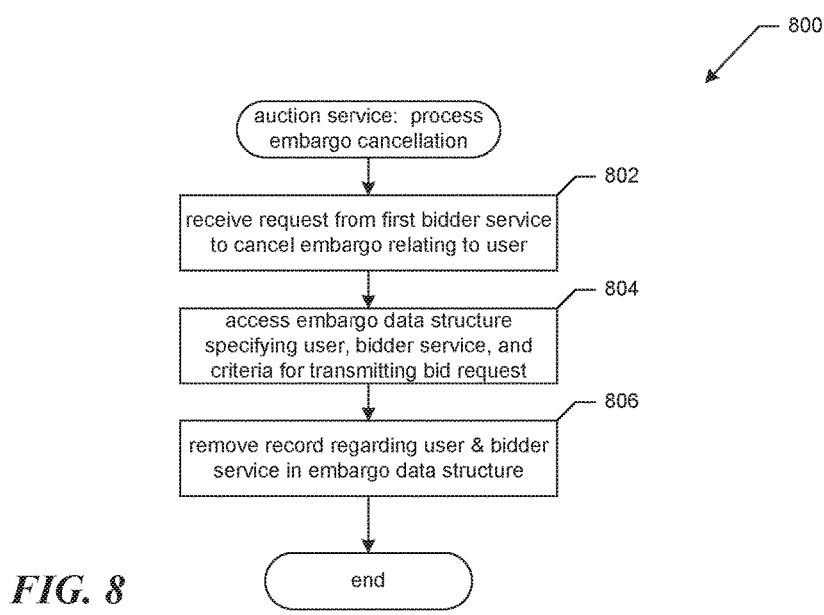
FIG. 8 is a flow diagram showing steps typically performed by the facility in some embodiments for an RTB auction service to process an embargo cancellation.

FIG. 8 is a flow diagram showing steps typically performed by the facility in some embodiments for an RTB auction service 206 to process an embargo cancellation. In step 802, the auction service 206 receives a request from a particular bidder service 210 to cancel an embargo on sending the bidder service 210 bid requests relating to a specified user 202. For example, the bidder service may wish to bid to present advertisements to the user 202 based on updated information about the user 202 and/or a new or updated advertiser 212 advertising campaign for which the user 202 is a suitable audience.

In step 804, the auction service 206 accesses an embargo data structure containing records that specify combinations of users, bidder services, and any criteria for whether to transmit to a particular bidder service 210 a bid request regarding an opportunity to advertise to a specified user 202. In step 806, the auction service 206 cancels from the embargo data structure a record specifying that the auction service 206 should embargo bid requests to the bidder service 210 for opportunities to advertise to the specified user 202. In various embodiments, the auction service 206 can cancel or remove such a record by deleting it from the embargo data structure, marking the record as inactive, changing the embargo criteria to never be satisfied (e.g., setting an embargo expiration time to a time in the past), etc. After the record has been removed, the facility will not exclude the bidder service 210 from bid requests soliciting bids to present advertisements to the user 202, as described above with reference to steps 406-416 of FIG. 4.

CONCLUSION

It will be appreciated by those skilled in the art that the above-described facility may be straightforwardly adapted or extended in various ways. For example, the facility may structure, store, and communicate an embargo request and/or an embargo data structure in a variety of ways. While the foregoing description makes reference to particular embodiments, the scope of the invention is defined solely by the claims that follow and the elements recited therein.

The invention claimed is:

1. A method for a real-time bidding ("RTB") auction service to manage bid requests relating to a specified user, the method comprising:
   receiving first advertisement request information, including first user data identifying a first user to whom an advertisement can be presented;
   causing to be transmitted to a first plurality of RTB bidder services a first bid request seeking bids for presenting an advertisement to the first user;
   after the transmitting, receiving, from a distinguished bidder service among the first plurality of bidder services, a request to embargo for a period of time bid requests seeking bids for presenting an advertisement to the first user;
   after receiving the embargo request:
      receiving second advertisement request information, including second user data for a second user to whom an advertisement can be presented;
      determining that the second user data identifies the first user;
      determining that the period of time has not expired; and
      in response to determining that the second user data identifies the first user and that the period of time has not expired, causing to be transmitted to a second plurality of bidder services not including the distinguished bidder service a second bid request seeking bids for presenting an advertisement to the first user.

2. The method of claim 1 wherein causing to be transmitted a first bid request seeking bids for presenting an advertisement to the first user includes transmitting browser cookie information identifying the first user or demographic information characterizing the first user.

3. The method of claim 1, further comprising transmitting, in response to the first advertisement request information, instructions to set a browser cookie on a computing system of the first user.

4. The method of claim 1 wherein receiving the embargo request comprises receiving a data structure including data identifying the first user, data identifying the bidder service, and data specifying a period of time.

5. The method of claim 4 wherein the data specifying a period of time comprises data specifying an embargo expiration time, data specifying an embargo duration, or data specifying an open-ended embargo.

6. The method of claim 1 wherein receiving the embargo request comprises receiving a bid response to the first bid request.

7. The method of claim 1, further comprising, after receiving the embargo request:
   receiving, from the distinguished bidder service, an embargo cancellation message regarding the first user;
   after receiving the embargo cancellation message, receiving third advertisement request information, including third user data that identifies the first user; and
   causing to be transmitted to a third plurality of bidder services including the distinguished bidder service a third bid request seeking bids for presenting an advertisement to the first user.

8. A method for a real-time bidding ("RTB") bidder service to cause an RTB auction service to manage bid requests relating to a specified user, the method comprising:
   receiving a bid request from an auction service seeking a bid for presenting an advertisement to a first user, including user data identifying the first user;

evaluating the user data; and based on the evaluating, transmitting to the auction service an embargo request specifying a period of time for the auction service to prevent bid requests seeking bids for presenting advertising messages to the first user from being sent from the auction service to the bidder service.

9. The method of claim 8 wherein receiving a bid request including user data identifying the first user includes receiving browser cookie information identifying the first user or demographic information characterizing the first user.

10. The method of claim 8 wherein evaluating the user data comprises identifying a web browser or computing system environment of the first user.

11. The method of claim 8 wherein evaluating the user data comprises determining suitability of the first user for one or more selected advertising campaigns.

12. The method of claim 8 wherein evaluating the user data comprises reviewing behavioral data regarding the first user.

13. The method of claim 8 wherein evaluating the user data comprises determining that the first user meets one or more embargoing criteria.

14. The method of claim 13 wherein determining that the first user meets one or more embargoing criteria comprises determining that the bidder service previously presented at least a threshold number of advertisements to the first user.

15. The method of claim 13 wherein determining that the first user meets one or more embargoing criteria comprises determining that the bidder service previously presented at least a threshold number of advertisements associated with a distinguished advertising campaign to the first user.

16. The method of claim 13 wherein determining that the first user meets one or more embargoing criteria comprises determining that the bidder service presented at least a threshold number of advertisements to the first user within a threshold period of recency.

17. The method of claim 13 wherein determining that the first user meets one or more embargoing criteria comprises determining that the bidder service previously won at least a threshold number of RTB auctions to present one or more advertisements to the first user.

18. The method of claim 8, further comprising determining the specified period of time for the auction service to embargo bid requests from being sent to the bidder service.

19. The method of claim 8 wherein the embargo request is attached to an RTB bid response, such that transmitting the embargo request to the auction service comprises transmitting the bid response to the bid request.

20. The method of claim 8 wherein transmitting the embargo request to the auction service comprises transmitting a message not attached to an RTB bid response.

21. The method of claim 8, further comprising transmitting, in response to the bid request, instructions to set a browser cookie on a computing system of the first user.

22. The method of claim 8, further comprising receiving, in response to transmitting the embargo request to the auction service, an acknowledgment confirming the embargo by the auction service.

23. A computer-readable storage medium having contents configured to cause a real-time bidding ("RTB") auction service computing system to, in order to manage bid requests relating to a specified entity:

receive, from a distinguished RTB bidder service, a request to embargo for a period of time bid requests related to a first entity;

after receiving the embargo request, receive advertisement request information, including entity data identifying an entity for which an advertisement can be presented;

determine that the entity data identifies the first entity;

determine that the period of time has not expired; and in response to determining that the entity data identifies the first entity and that the period of time has not expired, cause a bid request seeking bids for presenting an advertisement for the identified entity to be transmitted to a plurality of bidder services not including the distinguished bidder service.

24. The computer-readable storage medium of claim 23 wherein the entity data identifying an entity for which an advertisement can be presented identifies a user to whom an advertisement can be presented.

25. The computer-readable storage medium of claim 23 wherein the entity data identifying an entity for which an advertisement can be presented identifies a publisher of a web page where an advertisement can be presented to a user.

26. The computer-readable storage medium of claim 23 wherein the entity data identifying an entity for which an advertisement can be presented identifies a publisher website where an advertisement can be presented to a user.

27. The computer-readable storage medium of claim 24 wherein determining that the user data identifies the first user comprises:

identifying a portion of the user data comprising web browser cookie information; and comparing the user data web browser cookie information to stored cookie information associated with the first user.

28. The computer-readable storage medium of claim 23, further comprising contents configured to cause an RTB auction service computing system to:

receive, from the distinguished bidder service, an embargo cancellation message regarding the first entity;

after receiving the embargo cancellation message, receive second advertisement request information, including second entity data that identifies the first entity; and cause a second bid request seeking bids for presenting an advertisement for the first entity to be transmitted to a second plurality of bidder services including the distinguished bidder service.

29. The computer-readable storage medium of claim 28 wherein the embargo cancellation message comprises a request to embargo bid requests related to a first user for a period of time that has expired.

30. One or more computer memories collectively containing a real-time bidding ("RTB") user embargo data structure, the data structure comprising:

a plurality of entries, each entry comprising:
first information specifying a user identifier;
second information identifying an RTB bidder service; and
third information specifying, for the user identifier identified by the first information and the RTB bidder service identified by the second information, an embargo expiration time, such that the contents of the data structure are usable by an RTB auction service computing system to determine, for a particular user and RTB bidder service, whether to transmit to the RTB bidder service a bid request for a user identified by the user identifier.

* * * * *